United States Patent
Hartmann-Hansen

[11] 3,712,145
[45] Jan. 23, 1973

[54] OVERSPEED DETECTOR FOR ROTARY MEMBER

[75] Inventor: Tore Hartmann-Hansen, Wellsville, N.Y.

[73] Assignee: Worthington Turbine International Inc., Wellsville, N.Y.

[22] Filed: Dec. 8, 1971

[21] Appl. No.: 206,020

[52] U.S. Cl. ..................73/491, 73/548, 116/116
[51] Int. Cl. .........................................G01p 3/16
[58] Field of Search ..............73/548, 491; 116/116

[56] References Cited

UNITED STATES PATENTS

| | | | |
|---|---|---|---|
| 953,164 | 3/1910 | Winge | 116/116 |
| 2,060,907 | 11/1936 | Stankey | 116/116 |

*Primary Examiner*—James J. Gill
*Attorney*—Popper, Bain, Bobis, & Gilfillan

[57] ABSTRACT

An overspeed detector to be utilized on a rotary device for absolutely determining when overspeeding has occurred includes means providing a housing connected to and rotatable with the rotary member and having a main bore radially disposed with respect to the center or axial line of the rotary member, a plunger slidable in said main bore and a resilient member in the main bore coacting to maintain said plunger from sliding radially outward until the plunger is acted on by centrifugal force during overspeeding, and at least one or more bores traverse to the main bore so that indicator members freely and slidably mounted in the transverse bores can be urged outwardly into the main bore when the transverse bores are uncovered by the plunger during overspeed conditions of the rotary member.

6 Claims, 9 Drawing Figures

PATENTED JAN 23 1973
3,712,145
SHEET 1 OF 2
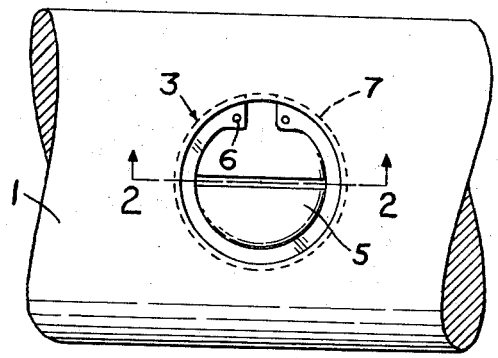
FIG. 1
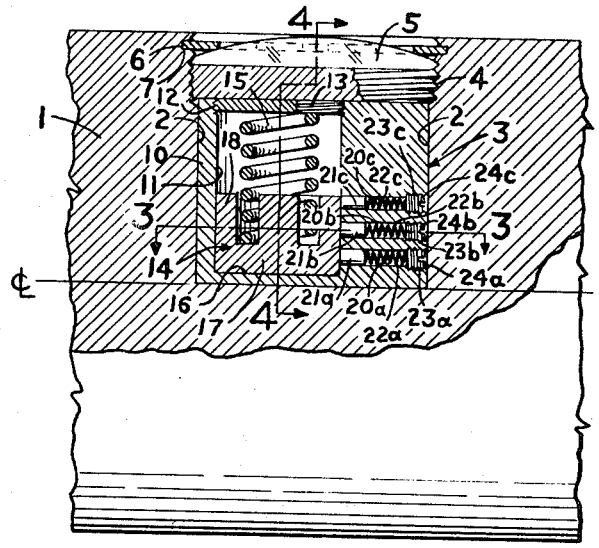
FIG. 2
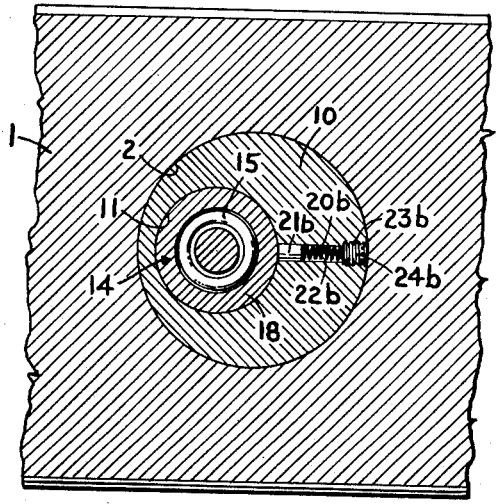
FIG. 3
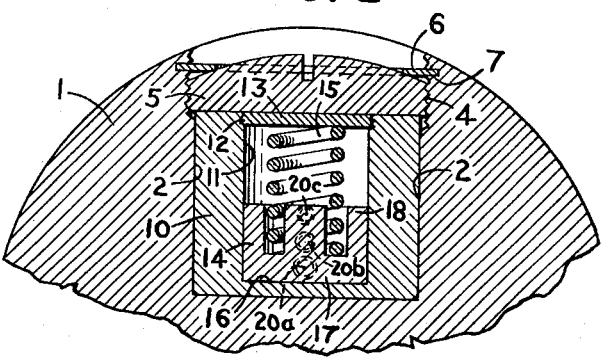
FIG. 4
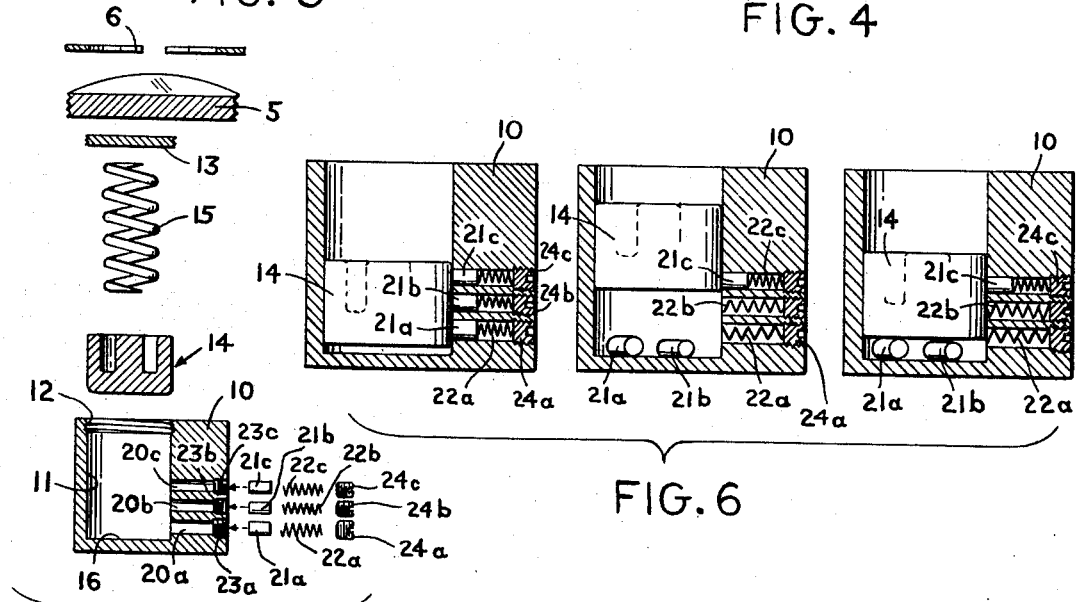
FIG. 5
FIG. 6

OVERSPEED DETECTOR FOR ROTARY MEMBER

BACKGROUND OF THE INVENTION

This invention relates to overspeed detectors or tell tale devices particularly to overspeed detectors for indicating when a rotary member has exceeded a given or predetermined rotational speed.

Most of the presently known machinery in use in commerce and industry is provided with one or more rotating elements. Often the machinery operation is governed by the speed of rotation of a rotating component, e.g., an output shaft or the like.

In devices with rotating elements such as turbines, compressors, internal combustion engines, etc., the operating speed from time to time is a critical factor particularly where potential legal liability and danger to human life or damage to other equipment may result when the rotational speeds exceed given or predetermined maximum speeds at which such devices are to be operated.

It is known that the speed of rotation of a device may be controlled by a governor which may of the fly-ball type, the electronic type or others types which are generally known. Such governors often are provided with overspeed trip devices which terminate delivery of power or operating fluid to a machine when the speed of rotation of a particular member exceeds this given or predetermined maximum speed. Additionally, overspeed trip devices may be provided independently of governors and it may be directly attached to a rotating member to be controlled.

Most governors in overspeed trip devices of the type noted above give no permanent indication or record that an overspeed of the machinery may have occurred. Ordinarily the governors and overspeed trip devices are either self-resetting or manually resettable to permit the machinery with which they are associated to be restarted.

For many conditions of operations the lack of permanent or semi-permanent record of overspeed occurrence is acceptable. For other situations, however, it is desirable to have a closer control over operation of the machinery, e.g., for the operator and for operational evaluation. In such instances the availability of a permanent or semi-permanent overspeed indicator, particularly one which is not easily resettable is desirable.

The best available apparatus for obtaining a record of machine operation is recognized by those skilled in the art to be a complete recording system which creates a permanent record. Such equipment, however, is expensive and not justifiable for many operations.

A semipermanent device which has been utilized in the prior art to create an indication of overspeed in a machine is a device called a tell-tale which is attachable to or integral with the apparatus and gives an indication of the past occurrence of an overspeed. Known overspeed indicators, detectors or tell-tale devices have been unsatisfactory for many operations because they are easily resettable by an operator thus introducing the possibility that the overspeed record may be altered and the indication of the overspeed condition lost.

It is the principal object of the present invention, therefore, to provide an overspeed detector or tell-tale device which reflects the occurrence of overspeed in a rotating member, is not easily resettable, is less susceptible of tampering and more of a permanent or semi-permanent indication of overspeed of the rotary member.

SUMMARY OF THE INVENTION

The foregoing principal object and others not enumerated are accomplished by the overspeed detector of the present invention, one embodiment of which may include housing means connected to and rotatable with a rotary member, a main bore in the housing means disposed radial to the axial line of the rotary member, a plunger slidably disposed within the radially extending main bore, means disposed in the radially extending bore for urging the plunger radially inwardly, at least one or more bores opening into and transversely of the radially extending main bore, indicating means in each of said transverse bores, said plunger for maintaining the indicator means in non-indicating position, and means coacting with said indicator means to urge the indicating means into indicating position on radially outward movement of the plunger due to the action of the centrifugal force.

BRIEF DESCRIPTION OF THE DRAWINGS

A more complete understanding of the present invention may be had from the following detailed description particularly when read in the light of accompanying drawings wherein:

FIG. 1 is a top elevational view of a rotating member having an overspeed detector in accordance with the present invention mounted therein.

FIG. 2 is a longitudinal section along the axial line of the rotating member taken on line 2—2 of FIG. 1.

FIG. 3 is a cross-section taken on line 3—3 of FIG. 2.

FIG. 4 is a cross-section taken on line 4—4 of FIG. 2.

FIG. 5 is an exploded view of the cartridge type overspeed detector shown in FIG. 1 with the housing or body member partly in vertical section.

FIG. 6 is a diagramatic illustration of the operation of the device shown in FIG. 1.

Referring to the drawings FIGS. 1 and 2 show a rotatable member 1 such as the shaft on a turbine, a compressor or an internal combustion engine or the like rotary devices having an overspeed detector cavity 2 formed in the shaft normal to the center or axial line of the shaft so that the overspeed detector generally designated 3 mounted therein will in assembled position be radially disposed with respect to the shaft or rotatable member and thus centrifugal force will act along the longitudinal line of overspeed detector 3.

Figure 7:
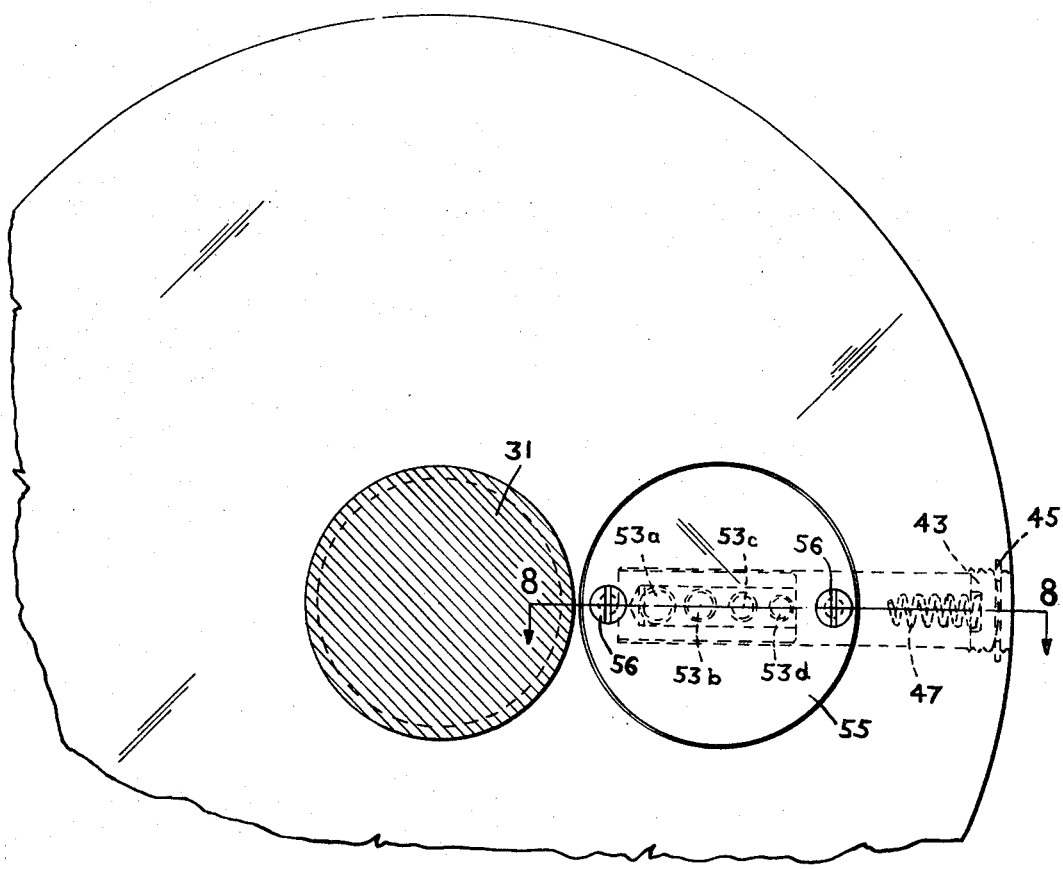
FIG. 7 is a side elevational view of another form of overspeed detector in accordance with the invention.

Cavity 2 is threaded at 4 about the mouth thereof so that the overspeed detector 3 can be held in the cavity 2 by a closure member 5 which may be threaded into and out of position to permit the overspeed detector to be mounted in or removed from cavity 2 in the shaft or rotatable member 1.

The closure member 5 is locked or safetied in position by a snap type locking washer 6 which engages and fits in locking groove 7.

The overspeed detector 3 in the form of the invention shown in FIGS. 1–5 of the drawings is the cartridge type and is adaptable for use on both small and large diameter shafts because it can be easily assembled or disassembled and placed into or removed from its position on the rotary member and this form of the invention will now be described.

CARTRIDGE TYPE OVERSPEED DETECTOR

Thus referring to FIGS. 2 to 5 of the drawings the overspeed detector 3 in accordance with the present invention is shown to include a housing or body member 10 which is elongated along its longitudinal axis and generally cylindrical in side elevation. It will be understood by those skilled in the art that the overspeed detector could be oblong, oval or square in side elevation depending on the type of cavity that is formed in the rotating member and that the particular shape involved may vary with the requirements of space and position on the shaft.

Further, the housing or body member 10 may be made of any suitable material such as steel, plastic, aluminum or any of a number of other materials depending upon the physical conditions which the overspeed detector may encounter in connection with the particular type of device in which it may be used.

Housing or body member 10 has a longitudinal bore 11 disposed to extend inwardly from one end substantially the entire length of the housing or body member 10. Adjacent the outer or open end, the bore 11 is threaded as at 12 to permit a cap member 13 to be threaded into and out of the bore to open and close the bore as may be required in order to permit a plunger or stop member 14 to be slidably disposed therein. A resilient means such as a spring 15 coacts with the plunger or stop member 14 to normally hold the plunger or stop member 14 in engagement with the inner or closed end 16 of the bore when the plunger 14, the resilient member 15 and cap means 13 are assembled for use, all of which is clearly shown in FIGS. 2 and 4 of the drawings.

Plunger or stop member 14 includes an end portion 17 and an elongated annular skirt or side portion 18 which has a length sufficient to cover the open end of the respective plurality of differently sized bores 20a, 20b and 20c which open onto the wall of the main bore 11.

As in shown in FIG. 6, the plunger or stop member 14 will remain in the position indicated in FIG. 2 of the drawings until the centrifugal forces acting therein are sufficient to overcome the forces being exerted by spring 15. When this occurs the plunger or stop member 11 will slide radially outward in the bore 11 away from the closed end 16 and depending upon the degree of centrifugal force acting will uncover one or more of the sized bores 20a, 20b and 20c which open on the wall of the bore 11.

When the overspeed cartridge is assembled into the cavity 2 on the rotary member since the longitudinal axis of the body member 10 lies on the same line as the center line of the cavity 2. The bore 11 will also be normal to the center or axial line of the rotary member. Bores 20a, 20b and 20c will be substantially parallel to the center or axial line of the rotary member but will be spaced respectively various radial distances therefrom depending on the overspeed ranges to be measured. As shown in FIGS. 2 to 6 the bores are in substantially the same vertical plane which plane is normal to the longitudinal line of main bore 11. However, it is thought clear that bores 20a, 20b and 20c can also be spaced circumferentially from each other so that they are not in substantially the same vertical plane but in different vertical planes each of which is normal to the longitudinal line of main bore 11.

Further, while only three boxes are shown, it is thought obvious to those skilled in the art that any number of bores may be utilized depending on the overspeed conditions to be measured.

Slidably and freely mounted in the bores 20a, 20b and 20c are indicator members 21a, 21b and 21c and their associated resilient elements or springs 22a, 22b and 22c. The resilient members or springs 22a, 22b and 22c are so constructed that when expended from their compressed position of assembly they will push the indicator members 21a, 21b and 21c out of the respective bores 20a, 20b and 20c into the main bore 11 of the overspeed detector as is illustrated in FIG. 6.

Therefore, in assembling the overspeed detectors, it is necessary to first position the plunger or stop member 14 in the bore 11 before the indicator members 21a, 21b and 21c are brought into operative relation with the plunger or stop member 14. Further in order to place the indicators members 21a, 21b and 21c and their associate springs 22a, 22b and 22c into assembled position as shown in FIG. 2 of the drawings the respective ends of the bores 20a, 20b and 20c remote from the ends thereof opening on the walls of bores 11 are threaded as at 23a, 23b and 23c so that removable plugs 24a, 24b and 24c may be replaceably mounted in the bores after the bores have received the required indicator members and spring members.

The overspeed detector when thus assembled may then be placed into use in a particular rotary mechanism.

USE AND OPERATION OF THE OVERSPEED DETECTOR

In using the overspeed detector the overspeed cartridge is assembled as above described.

The assembled cartridge is then placed in the cavity 2 and locked in position by means of the closure member 5 and lock washer 6.

By reference to FIG. 6 it will be clear that as long as the rotating member or shaft 1 is rotating at speeds within the given or predetermined speed ranges for the particular device the overspeed detector will not be actuated and will remain inactive.

However, if the rotary member or shaft 1 exceeds the given or predetermined speed ranges of rotation whatever the reason therefore the centrifugal forces acting ever the reason therefore the centrifugal forces acting on the plunger or stop member 14 will increase sufficiently to move the plunger or stop member radially outwardly against the spring member 16. If the movement of the plunger or stop member uncovers any of the openings of the respective transverse bores 20a, 20b and 20c then one or more of the indicator members 21a, 21b or 21c will be immediately thrust out of the uncovered transverse bore or bores due to the expansion of the spring members associated therewith.

When this occurs such indicator members cannot accidentally fall back into the bores 20a, 20b and 20c and will remain in the main bore 11 so that when the overspeed detector is removed from the shaft it will be apparent on disassembly as to the extent or range within which overspeeding of the rotary member has occurred by reason of those indicator means that have been discharged into the main bore 11.

Since each of the indicator bores 20a, 20b and 20c are different in size anyone using the overspeed detector will be able to determine which indicating members have been discharged during the overspeed conditions of operations.

FIG. 6 FORM OF THE INVENT

Where the overspeed detector is not susceptible of use as a cartridge or where it is more expedient to use an assembly of parts, the overspeed detector or tell-tale device may be applied to a device or member generally designated 30 which is mounted on and rotatable with the rotary member 31. This arrangement is illustrated in FIGS. 7 and 8 of the drawings.

Figure 8:
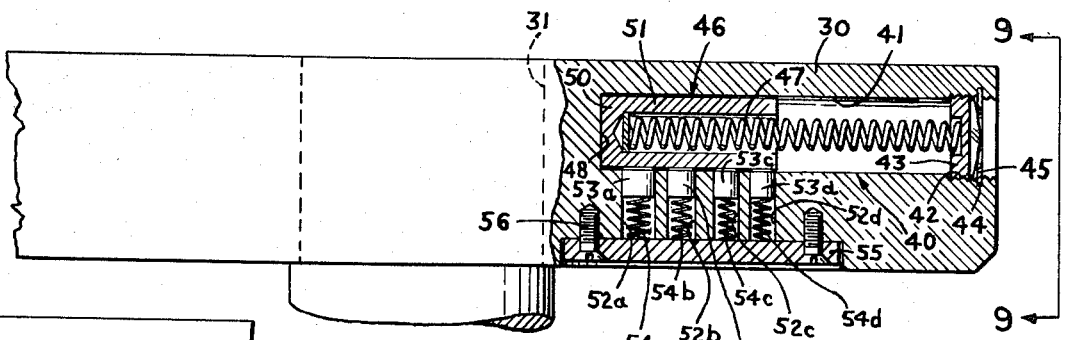
FIG. 8 is a partial cross-sectional view of the form of overspeed detector shown in FIG. 7.
Figure 9:
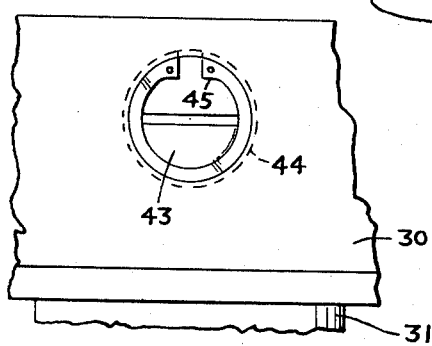
FIG. 9 is a plan view taken on line 9—9 of FIG. 8.

Thus, by reference to FIGS. 7 and 8 the overspeed detector generally designated 40 is mounted in the member 30 which forms the housing for the overspeed detector.

The housing or member 30 has a radially extending main bore 41 which extends inwardly from an outer surface of the member 30 a sufficient depth or length short of the rotary member. Adjacent the outer or open end the main bore 44 is threaded as at 41 to receive a closure member 43 which can be threaded into and out of the bore to open and close the same as may be required.

As in the case of the cartridge type form of the present invention locking groove 44 and locking washer 45 mounted thereon are provided to lock the closure member 43 in assembled position.

A plunger or stop member 46 is slidably disposed in the main bore 41 and coacts with a resilient member or spring 47 which acts in assembled position to normally hold the plunger or stop member 46 in engagement with the inner or closed end 48 of the main bore 41 until centrifugal force developed by the rotary member is sufficient to move the plunger or stop member 46 radially outward against the force being exerted by the spring 47.

Plunger or stop member 46 includes an end portion 50 and an elongated or skirt portion 51 which has a length sufficient to cover the open end of a plurality of differently sized bores 52a, 52b, 52c and 52d disposed in the member 30 so they extend parallel to the axial line of rotary member 31 and spaced at various radial distances therefrom depending on the range of overspeeds to be monitored or detected, and opening onto the wall of main bore 41 of the overspeed detector 40.

So long as the rotary member does not overspeed, the plunger 46 will normally be maintained by the spring 47 in the position as shown in FIGS. 7 and 8 of the drawings namely covering the opening of the bores 52a, 52b, 52c and 52d. However, when overspeed occurs the plunger or stop member will slide radially outward and depending on the amount of centrifugal force acting on the plunger or stop member 46 will uncover one or more of the openings for the respective bores 52a, 52b, 52c and 52d.

There is slidably and freely mounted in bores 52a, 52b, 52c and 52d, indicator members 53a, 53b, 53c and 53d and their associated elements or springs 54a, 54b, 54c and 54d. The resilient elements or springs 54a, 54b, 54c and 54d are so constructed that whenever they expand from their compressed assembled position they will push the indicator members 53a, 53b, 53c and 53d out of their respective bores into the main bore 41 of the overspeed detector 40.

The bores 52a, 52b, 52c and 52d open on the side wall of the member 30 and a retainer plate 55 which is connected by threaded members 56 to the member or device 30 will act to hold each indicator member 53a, 53b, 53c and 53d and its associated resilient element or spring 54a, 54b, 54c and 54d in assembled position for operation.

In using the overspeed detector 40 it is assembled by first positioning the plunger or stop member 46, the spring 47, the closure member 43 and locking washer 45.

Then the indicator member 53a, 53b, 53c and 53d and their associated springs 54a, 54b, 54c and 54d may be mounted in their respective bores 52a, 52b, 52c and 52d and the retainer plate 55 attached to hold them in assembled position.

The indicator members 53a, 53b, 53c and 53d when so assembled will be in abutment with the skirt portion 51 of the plunger 46 and the springs 54a, 54b, 54c and 54d will be compressed.

OPERATION -- FIGURE 6 FORM OF THE INVENTION

If the rotary member 31 exceeds the given or predetermined maximum speed or rotation whatever may be the reason, the centrifugal force acting will force the plunger 46 radially outward and as in the case of the cartridge type device if the plunger is moved a sufficient radial distance will uncover one or more of the bores 52a, 52b, 52c and 52d.

When this occurs the indicator member or members in the transverse bores that are uncovered will be pushed into the main bore 41 of the overspeed detector 40.

Since each of the bores 52a, 52b, 52c and 52d are different in size anyone using the overspeed detector will be able to determine which indicating members have been discharged during the overspeed conditions of operations. It is thought clear from the above description that each form of the invention must be reassembled after the rotary member to which the detector in accordance with the present invention has been applied passes through an overspeed condition of operation.

Thus, until disassembled the overspeed detector constitutes a permanent record of the overspeed condition. However, once reassembled it can be reused for the same purposes.

Those persons skilled in the art will recognize that the overspeed detector can be sealed in position so that the operator or third parties cannot tamper with the device until it has been properly inspected.

It will be understood that the invention is not to be limited to the specific construction or arrangement of parts shown but that they may be widely modified within the invention defined by the claims.

What is claimed is:

1. An overspeed detector for a rotary member comprising;

means forming a main bore disposed radial to the axial line of the rotary member, a plunger normally maintained radially inward in said main bore and to be forced radially outward by centrifugal force at overspeed conditions, indicator means in abutment with and held by said plunger in non-indicating position before overspeed conditions occur, and means disposed to force the indicator means into the main bore when said plunger is forced radially outward sufficient to release the indicator means.

2. An overspeed detector for a rotary member comprising;

housing means, a main bore in said housing means disposed radial to the axial line of the rotary member, plunger means slidable in said bore, resilient means normally maintaining said plunger at the innermost point of said bore, at least one indicator bore in said housing opening into said main bore, an indicator member in each indicator bore disposed for operative engagement with the plunger when not indicating an overspeed condition, and means to force each indicator member out of an indicator bore into the main bore when centrifugal force acting on the plunger at overspeed conditions causes it to slide radially outward to uncover such indicator bore.

3. In an overspeed detector as claimed in claim 2 wherein the plunger includes, an annular skirt having a length sufficiently to normally cover the openings of each indicator bore prior to an overspeed condition of operation.

4. In an overspeed detector as claimed in claim 2 wherein each indicator bore has a different diameter.

5. In an overspeed detector as claimed in claim 2 having more than one indicator bore, and each indicator bore is spaced at various radially distances from the axial line of the rotary member.

6. In an overspeed detector as claimed in claim 4 wherein each respective indicator bore is in substantially the same vertical place.

* * * * *